(12) United States Patent
Tamura

(10) Patent No.: US 6,922,433 B2
(45) Date of Patent: Jul. 26, 2005

(54) CDMA DEMODULATION CIRCUIT AND CDMA DEMODULATION METHOD

(75) Inventor: Koichi Tamura, Tokyo (JP)

(73) Assignee: NEC Corporation, Tokyo (JP)

( * ) Notice: Subject to any disclaimer, the term of this patent is extended or adjusted under 35 U.S.C. 154(b) by 885 days.

(21) Appl. No.: 09/818,912

(22) Filed: Mar. 28, 2001

(65) Prior Publication Data

US 2001/0026580 A1 Oct. 4, 2001

(30) Foreign Application Priority Data

Mar. 29, 2000 (JP) ........................................ 2000-090442

(51) Int. Cl.⁷ .......................... H04B 15/00; H04K 1/00; H04L 27/30
(52) U.S. Cl. ........................ 375/148; 375/147; 375/144; 375/145; 375/149
(58) Field of Search ................................. 375/144, 145, 375/147, 148, 349, 347; 455/303–305, 276.1, 273, 277.1, 277.2, 278.1; 370/342, 335

(56) References Cited

U.S. PATENT DOCUMENTS

| | | | | |
|---|---|---|---|---|
| 5,999,560 A | * | 12/1999 | Ono | 375/148 |
| 6,157,687 A | * | 12/2000 | Ono | 375/347 |
| 6,178,193 B1 | * | 1/2001 | Kondo | 375/130 |
| 6,272,167 B1 | * | 8/2001 | Ono | 375/144 |
| 6,456,827 B1 | | 9/2002 | Kubo et al. | |
| 6,795,422 B2 | * | 9/2004 | Ohsuge | 370/342 |
| 6,813,309 B1 | * | 11/2004 | Ogino | 375/148 |
| 2003/0026233 A1 | * | 2/2003 | Ohsuge | 370/342 |

FOREIGN PATENT DOCUMENTS

| | | |
|---|---|---|
| EP | 0 884 861 | 12/1998 |
| EP | 1 096 711 | 5/2001 |
| JP | 7-66760 | 3/1995 |
| JP | 10-271034 | 10/1998 |
| JP | 10-308689 | 11/1998 |
| JP | 11-4213 | 1/1999 |
| JP | 11220774 | 8/1999 |
| JP | 11-251962 | 9/1999 |
| JP | 11-261528 | 9/1999 |
| JP | 11-274982 | 10/1999 |
| WO | WO 00/02338 | 1/2000 |

* cited by examiner

Primary Examiner—Phuong Phu
(74) Attorney, Agent, or Firm—McGinn & Gibb, PLLC

(57) ABSTRACT

To provide a CDMA demodulation circuit and a CDMA demodulation method capable of maintaining good receiving characteristics even in a mobile communication environment. A fading pitch estimation portion estimates a time at which a level of a received input signal drops due to fading by monitoring fluctuation in the level provided by a rake combining portion. Before the level drops, a finger path assignment control portion controls assignment of path timing to a fingers portion performed by a finger path assignment portion.

22 Claims, 9 Drawing Sheets

DELAY PROFILE

CDMA DEMODULATION CIRCUIT AND CDMA DEMODULATION METHOD

BACKGROUND OF THE INVENTION

1. Field of the Invention

The present invention relates to a Code Division Multiple Access (CDMA) demodulation circuit and a CDMA demodulation method, and more particularly to the CDMA demodulation circuit and the CDMA demodulation method used for mobile communication devices.

2. Description of the Related Art

Conventionally, there has been a drawback in the mobile communication environment that fading occurs by transmitted radio waves being reflected and diffracted so that accurate timing of paths cannot be estimated, which causes degradation in receiving characteristics. Hence, examples of means for solving this drawback have been disclosed in a Japanese Patent Laid-Open No. 11-4213 (hereafter referred to as a document 1), a Japanese Patent Laid-Open No. 11-274982 (hereafter referred to as a document 2), a Japanese Patent Laid-Open No. 10-271034 (hereafter referred to as a document 3), a Japanese Patent Laid-Open No. 11-251962 (hereafter referred to as a document 4), and a Japanese Patent Laid-Open No. 11-261528 (hereafter referred to as a document 5).

The technique disclosed in the document 1 is to determine a cycle for integrating correlation power according to a length of an actual fading cycle. The technique disclosed in the document 2 is to measure a delay profile of a baseband signal while changing a measuring time for measuring the delay profile, and to select a desired number of scattered waves based on the measured delay profile to assign respective reception timing to the corresponding de-spreading circuit. The technique disclosed in the document 3 is to provide delay profile calculating means for applying moving average for a moving average period corresponding to a timing fluctuation in a selected path, allowing path movement to follow a rapid timing fluctuation in the selected path by decreasing the moving average period when the timing fluctuation is big and by increasing it when the fluctuation is small. The technique disclosed in the document 4 is to search a reception path timing by means of data received at a high reception level and to perform correlation and combination according to the reception paths. The technique disclosed in the document 5 comprises a searcher unit that obtains sequences of measurements from a multipath profile, the searcher unit having a predetermined timing resolution that separates adjacent measurements within the sequence. The technique reads the sequences of measurements, derives timing offsets having resolutions higher than the predetermined timing resolution of the searcher unit, and assigns finger processing elements to the best candidate paths using the timing offsets.

Among the above documents, the technique disclosed in the document 1 in particular measures the length of the actual fading cycle to determine the most suitable cycle for that length to integrate the correlation power. In contrast, the present invention measures times at which the level drops due to actual fading and, from these drop times, estimates a time at which the level drops due to the next fading. Then, it controls assignment of path timing to a fingers portion before the level drops. Such a technique for estimating the time at which the level drops due to fading is not disclosed in any of the above referred documents from 2 to 5.

SUMMARY OF THE INVENTION

Therefore, the object of the invention consists in providing a CDMA demodulation circuit and method which are capable of maintaining good reception quality even in a mobile environment by estimating a time at which the level drops due to fading and by controlling assignment of path timing to a fingers portion before the level actually drops.

For solution of the above mentioned problem, the present invention is the CDMA demodulation circuit comprising delay profile calculating means for calculating delay profiles of received signals; path assigning means for assigning path locations to a plurality of fingers based on the calculation result obtained in the delay profile calculating means; the plurality of fingers to which the path locations are assigned by the path assigning means, the fingers de-spreading the assigned paths; and rake combining means for combining output of the plurality of fingers. This demodulation circuit is characterized by comprising reception controlling means that estimates a drop cycle of the reception level from the reception level combined by the rake combining means and that reduces degradation in receiving characteristics using the estimation result.

Further, another invention according to the present invention is the demodulation method for the CDMA demodulation circuit comprising the delay profile calculating means for calculating delay profiles of received signals; the path assigning means for assigning path locations to the plurality of fingers based on the calculation result obtained in the delay profile calculation means; the plurality of fingers to which the path locations are assigned by the path assigning means, the fingers de-spreading the assigned paths; and the rake combining means for combining output of the plurality of fingers. This demodulation method is characterized by comprising a first step of estimating the drop cycle of the reception level from the reception level combined by the rake combining means to reduce degradation in receiving characteristics using the estimation result.

The present invention and the other invention according to the present invention make it possible to maintain good reception quality even in a mobile environment by estimating the time at which the level drops due to fading, and by controlling the assignment of path timing to the fingers portion before the level actually drops.

DESCRIPTION OF THE PREFERRED EMBODIMENT

Figure 1:
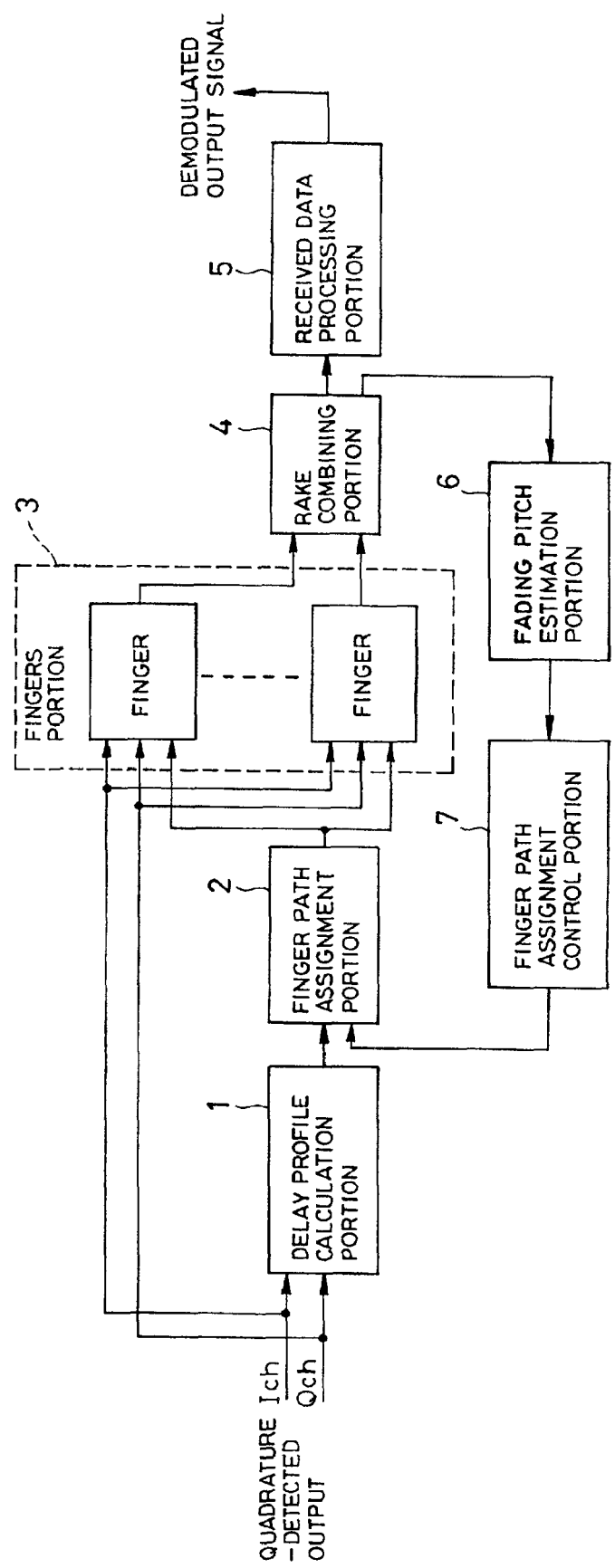
FIG. 1 is a block diagram of a first embodiment of a CDMA demodulation circuit in accordance with the present invention.

Firstly, an outline of the present invention will be described. Referring to a block diagram of a CDMA demodulation circuit in FIG. 1, a fingers portion 3 performs de-spreading, and a rake combining portion 4 determines a reception level. A fading pitch estimation portion 6 estimates a drop cycle of the reception level from the obtained reception level, and a finger path assignment control portion 7 uses the result to control a finger path assignment portion 2. In this manner, good receiving characteristics can be achieved even in a mobile communication environment by monitoring the reception level and avoiding use of data in a poor receiving condition to update path locations for assigning to the fingers.

The embodiments of the present invention will be described below with reference to the appended drawings. FIG. 1 is a block diagram of a first embodiment of the CDMA demodulation circuit according to the present invention. Referring to FIG. 1, the CDMA demodulation circuit is configured to comprise a delay profile calculation portion 1, the finger path assignment portion 2, the fingers portion 3, the rake combining portion 4, a received data processing portion 5, the fading pitch estimation portion 6, and the finger path assignment control portion 7.

Figure 2:
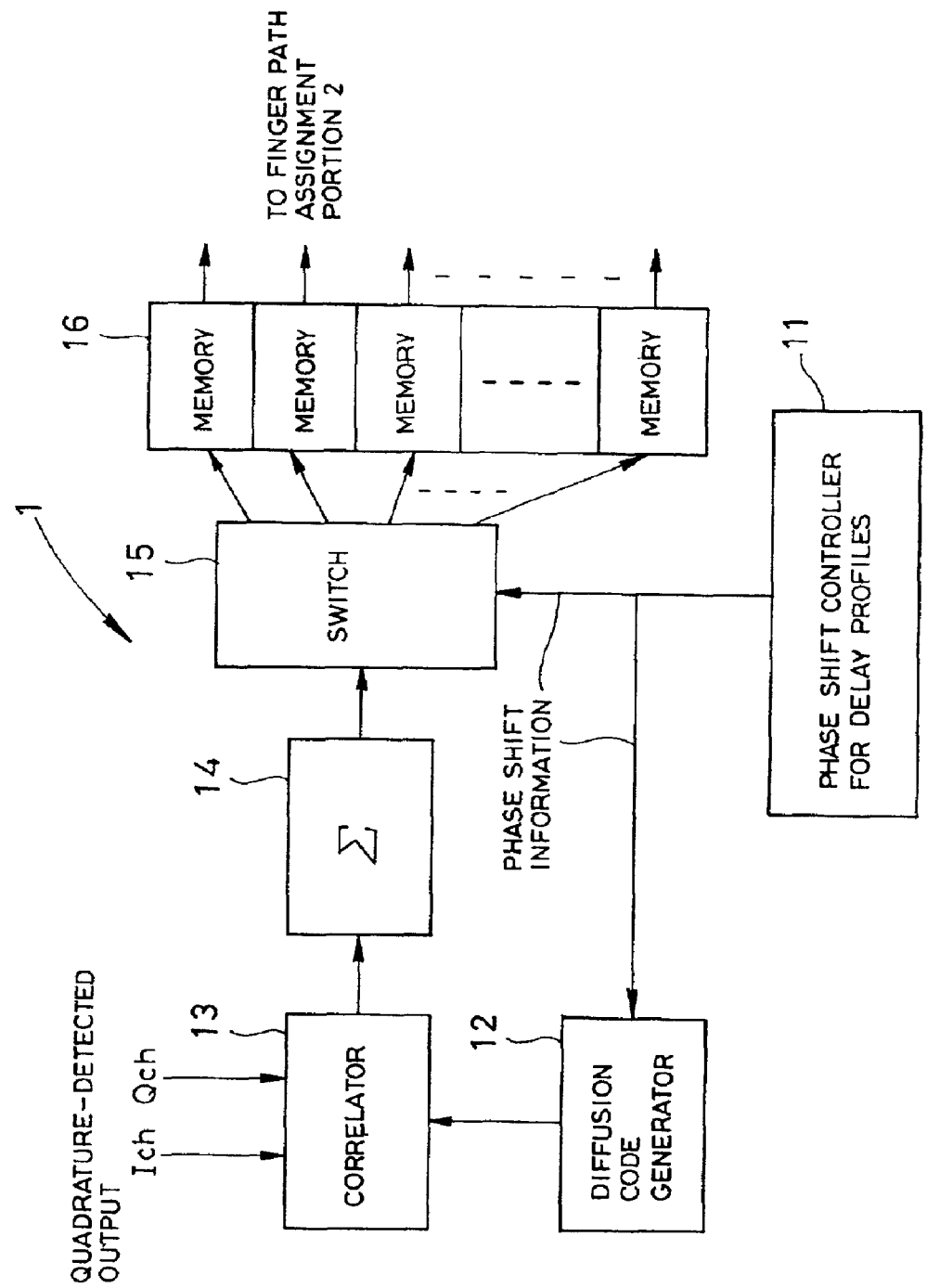
FIG. 2 is a block diagram of an example of a delay profile calculation portion 1.

Now, the delay profile calculation portion 1 will be described. FIG. 2 is a block diagram of an example of the delay profile calculation portion 1. Referring to FIG. 2, the delay profile calculation portion 1 is configured with a phase shift controller for delay profiles 11, a diffusion code generator 12, a correlator 13, an integrator 14, a switch 15, and memory 16.

In the delay profile calculation port ion 1, the diffusion code generator 12 generates diffusion codes shifted by a phase shift amount, and the correlator 13 calculates correlation power of I components (Ich) and Q components (Qch) that were quadrature-detected and demodulated. The integrator 14 integrates the correlation power, and the phase shift controller for delay profiles 11 periodically updates the phase shift amount. The switch 15 switches connections between the integrator 14 and the memory 16 according to the phase shift amount to periodically store delay profile data in the memory 16.

The delay profile data stored in the memory 16 is peak-searched by the finger path assignment portion 2 and assigned, in the higher power-correlation value order, to the fingers portion 3 as the path locations for assigning to the fingers.

In the fingers portion 3, each finger de-spreads the assigned path, and its output is rake-combined by the rake combining portion 4. Then, signals combined by the rake combining portion 4 are demodulated in the received data processing portion 5 and are also input to the fading pitch estimation portion 6.

In the fading pitch estimation portion 6, a fading pitch is estimated by monitoring fluctuation in the input reception level. Then, according to the result, the finger path assignment control portion 7 controls the finger path assignment portion 2.

Figure 3:
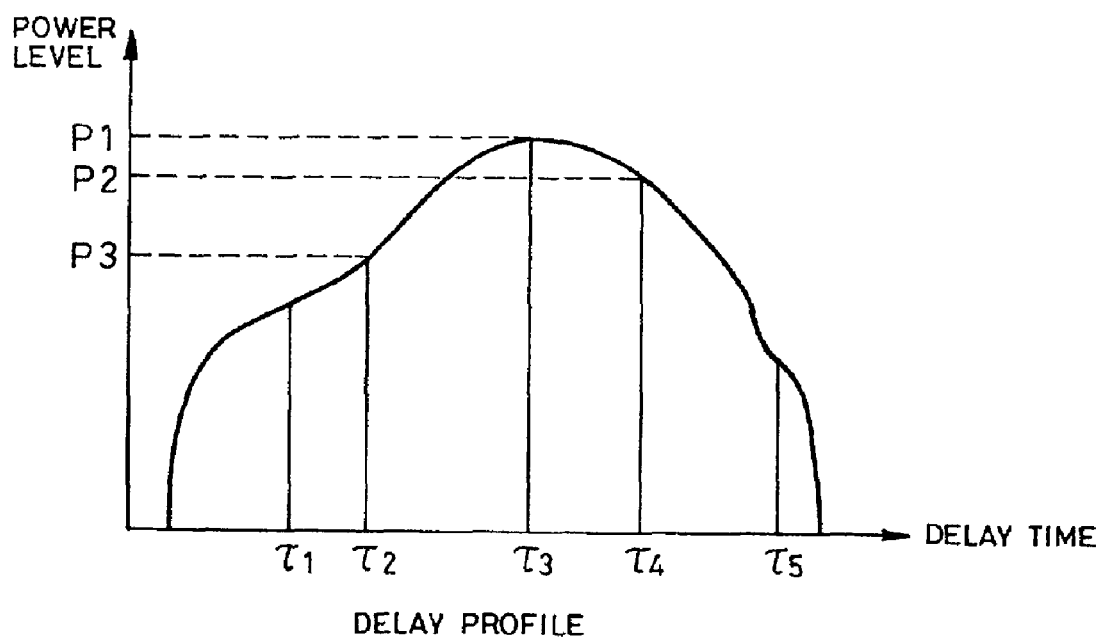
FIG. 3 shows an example of characteristics of a delay profile.

FIG. 3 is a diagram showing an example of characteristics of a delay profile. As shown in FIG. 3, first the path location (delay time τ3) with the highest power correlation value (power level P1) is assigned to a first finger, then the path location (delay time τ4) with the second highest power correlation value (power level P2) is assigned to a second finger, and the path location (delay time τ2) with the third highest power correlation value (power level P3) is assigned to a third finger. This is an example where there are three fingers.

Figure 4:
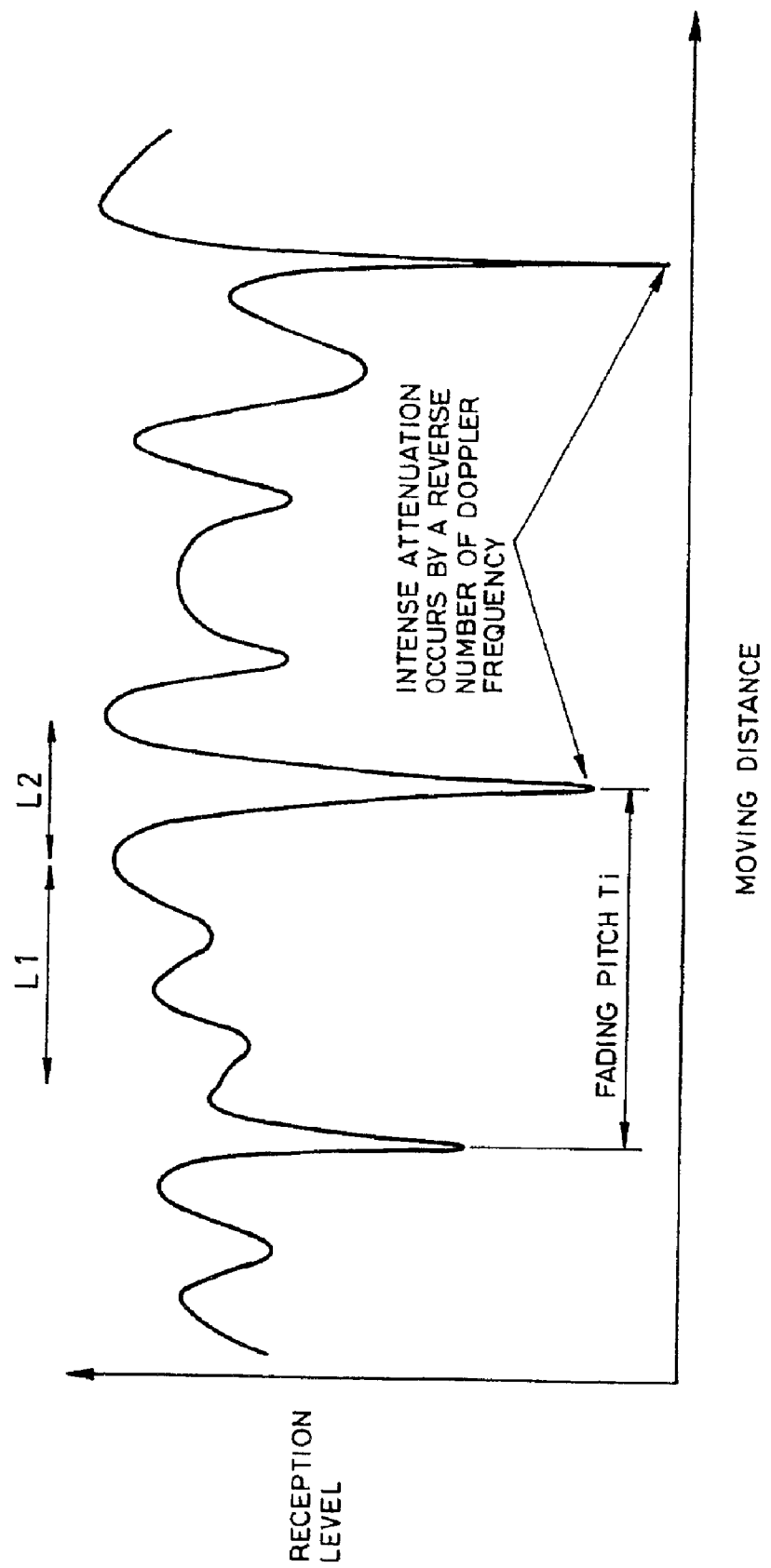
FIG. 4 is a diagram of reception level-to-moving distance characteristics, which indicates fast fading of radio waves in mobile communication.

Next, operation of the fading pitch estimation portion 6 will be described in detail. FIG. 4 is a diagram of reception level-to-moving distance characteristics, which indicates fast fading of radio waves in mobile communication. In mobile propagation paths, radio waves forms standing waves with being reflected and diffracted by buildings etc. around them. When a receiving point moves in the waves, intense fading over a range of more than several tens of dB occurs. It is known that the minimum value among the intervals between occurrences of intense level attenuation (referred to as a fading pitch (Ti)) is equal to an inverse number of Doppler frequency. The fading pitch estimation portion 6 estimates this fading pitch Ti by monitoring fluctuation in the reception level and predicts the time of a next intense level attenuation.

Figure 5:
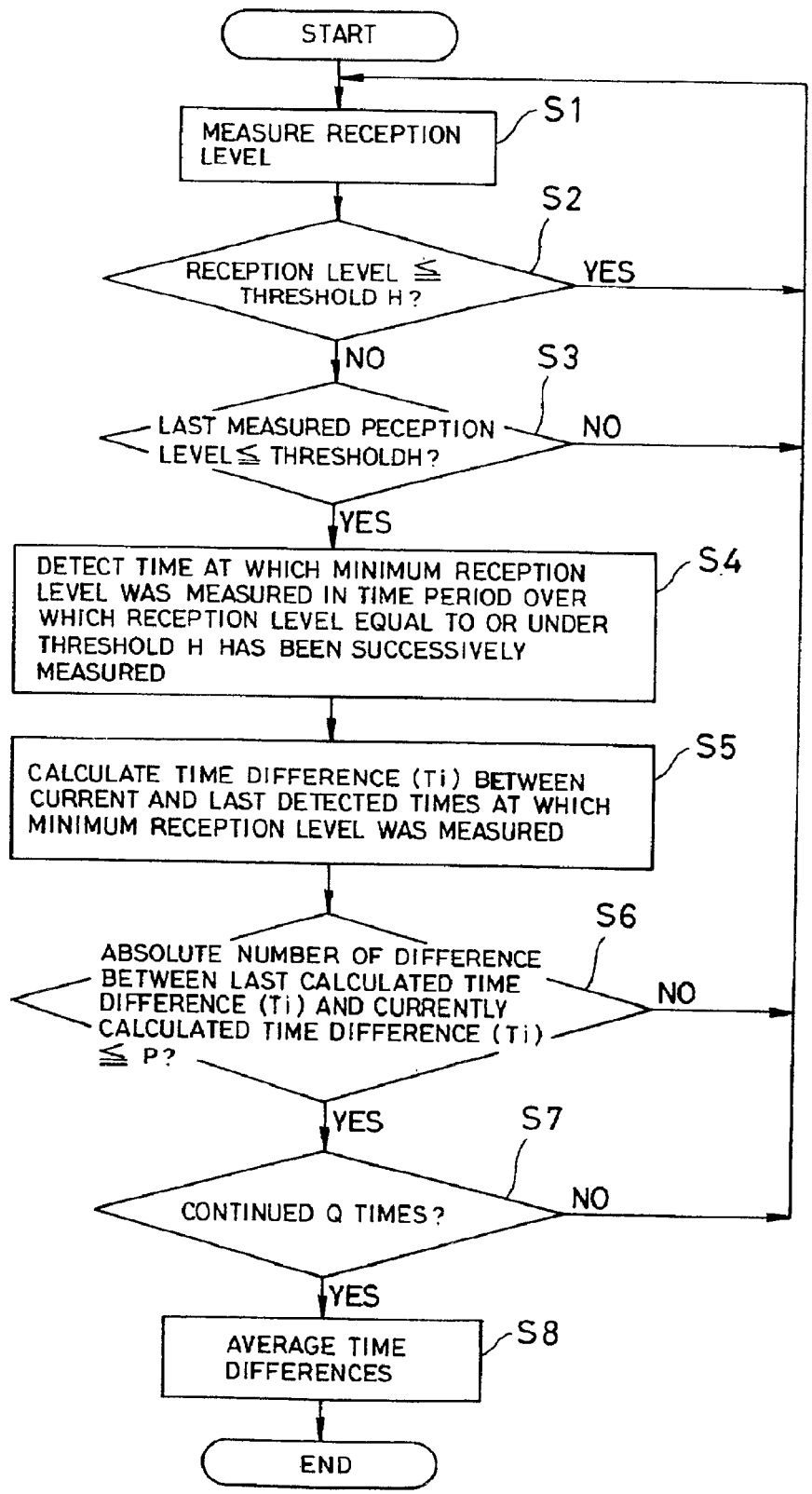
FIG. 5 is a flow chart showing the operation for estimating a fading pitch Ti in a fading pitch estimation portion 6.

Next, the operation for estimating the fading pitch Ti will be described. FIG. 5 is a flow chart showing the operation for estimating the fading pitch Ti in the fading pitch estimation portion 6. Referring to FIG. 5, the fading pitch estimation portion 6 first measures the reception level (S1). Next, it determines whether or not the reception level is equal to or below the threshold H (H is a positive, real number) (S2). If the level is equal to or below the threshold H (YES at S2), the operation returns to the step S1. On the other hand, if the level is above the threshold H (NO at S2), it determines whether of not the reception level measured last time is equal to or below the threshold H (S3). Then, if the level is above the threshold H (NO at S3), the operation returns to the step S1. On the other hand, if the level is equal to or below the threshold H (YES at S3), it detects a time at which a minimum level was measured within a time period in which the reception level equal to or below the threshold H has been successively measured (S4). Next, it calculates a time difference (fading pitch Ti) between the last detected time at which a minimum reception level was measured and the second last detected time at which a minimum reception level was measured (S5).

Then, it determines whether or not the absolute value of the difference between the last calculated time difference Ti and the currently calculated time difference Ti is equal to or below P (P is a positive, real number) (S6). Here, the reason to determine whether or not the absolute value is equal to or below P is that such a case is out of the object of the present invention that the absolute value of the difference between the last calculated time difference Ti and the currently calculated time difference Ti exceeds P. That is, estimation of the fading pitch Ti would be difficult if the fading pitch Ti exceeds a certain time length. If the absolute value is above P at the step S6 (NO at S6), the operation returns to the step S1. On the other hand, if the absolute value is equal to or below P at the step S6 (YES at S6), the operation determines whether or not absolute values equal to or below P have continued for Q times (Q is a positive integer) (S7). If they have not continued for Q times at the step S7 (NO at S7), the operation returns to the step S1. On the other hand, if they have continued for Q times at the step S7 (YES at S7), it averages those time differences Tis (S8). This average of the time differences Ti is the estimation of the fading pitch Ti.

Next, an operation of the finger path assignment control portion 7 will be described in detail. Before that, an operation of the finger path assignment portion 2 will be briefly described. In the finger path assignment portion 2, a backward alignment guard level: N (N is a positive integer) and a forward alignment guard level: M (M is a positive integer) are set to prevent flapping in updating the path locations for assigning to the fingers. The guard levels allow that only the path locations detected successively for N times by peak search processing are assigned to the fingers. Further, once the path locations are assigned to the fingers, they are not excluded from paths for assigning to the fingers unless it is determined successively for M times that they are not detected. The peak-searched and detected path locations that meet these conditions are input to the fingers portion 3 as the paths for assigning to the fingers.

Figure 6:
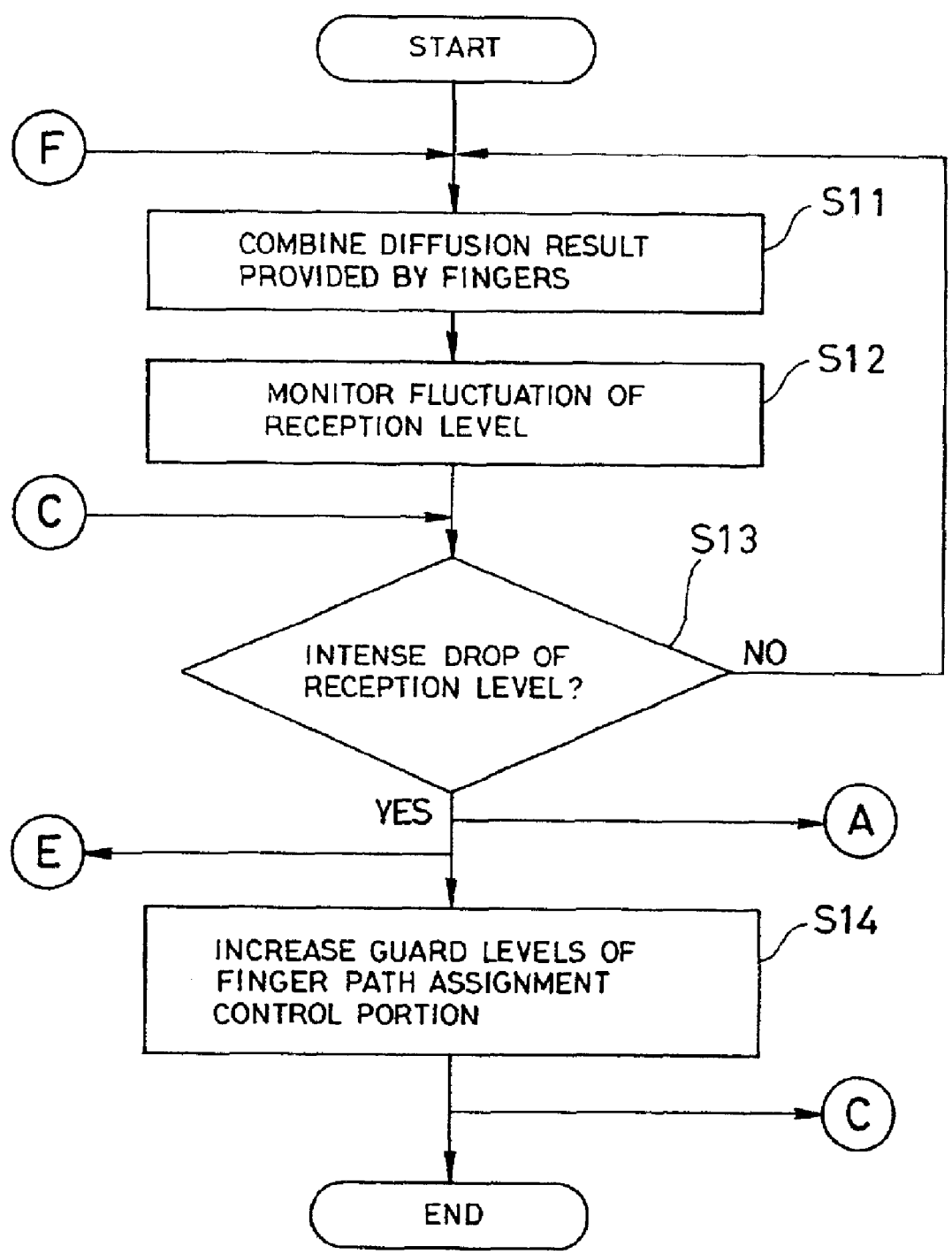
FIG. 6 is a flow chart showing the operation of a finger path assignment portion 7.

FIG. 6 is a flow chart showing the operation of the finger path assignment control portion 7. For convenience sake, this flow chart also includes the operation in the rake combining portion 4 and the fading pitch estimating portion 6. Referring to FIG. 6, each finger de-spreads an assigned path in the fingers portion 3, and the output is rake-combined by the rake combining portion 4 (S11). The signals combined by the rake combining portion 4 are demodulated by the received data processing portion 5 and are also inputted to the fading pitch estimation portion 6. In the fading pitch estimation portion 6, the fading pitch is estimated by monitoring fluctuation in the input reception level (S12). According to the result, the finger path assignment control portion 7 controls the finger path assignment portion 2 (S13, S14).

The step 12 and the subsequent steps will be specifically described. Firstly, the fading pitch estimation portion 6 estimates the drop cycle of the reception level in terms of Doppler frequency by monitoring fluctuation in the reception level (S12). If the finger path assignment control portion 7 determines from the estimation result that a drop of the reception level due to fading will be intense (YES at S13), it controls the finger path assignment portion 2 to increase its forward and backward alignment guard levels before the reception level drops (S14). That is, it controls the finger path assignment portion 2 to maintain the finger path assignment result obtained from data with less fading influence and to reduce tendency to employ the finger path assignment result to be obtained from data with significant fading influence.

Thus, referring to FIG. 4, if it is determined that intense level attenuation will begin, the finger path assignment control portion 7 controls the guard levels of the finger path assignment portion 2 before the reception level drops by increasing tendency to maintain, during the reception level are suffered from intense level attenuation (see L2 in FIG. 4), the finger path assignment result obtained from the data received just before the level attenuation (see L1 in FIG. 4). This makes it possible to reduce fading influence and to maintain good reception quality.

Figure 7:
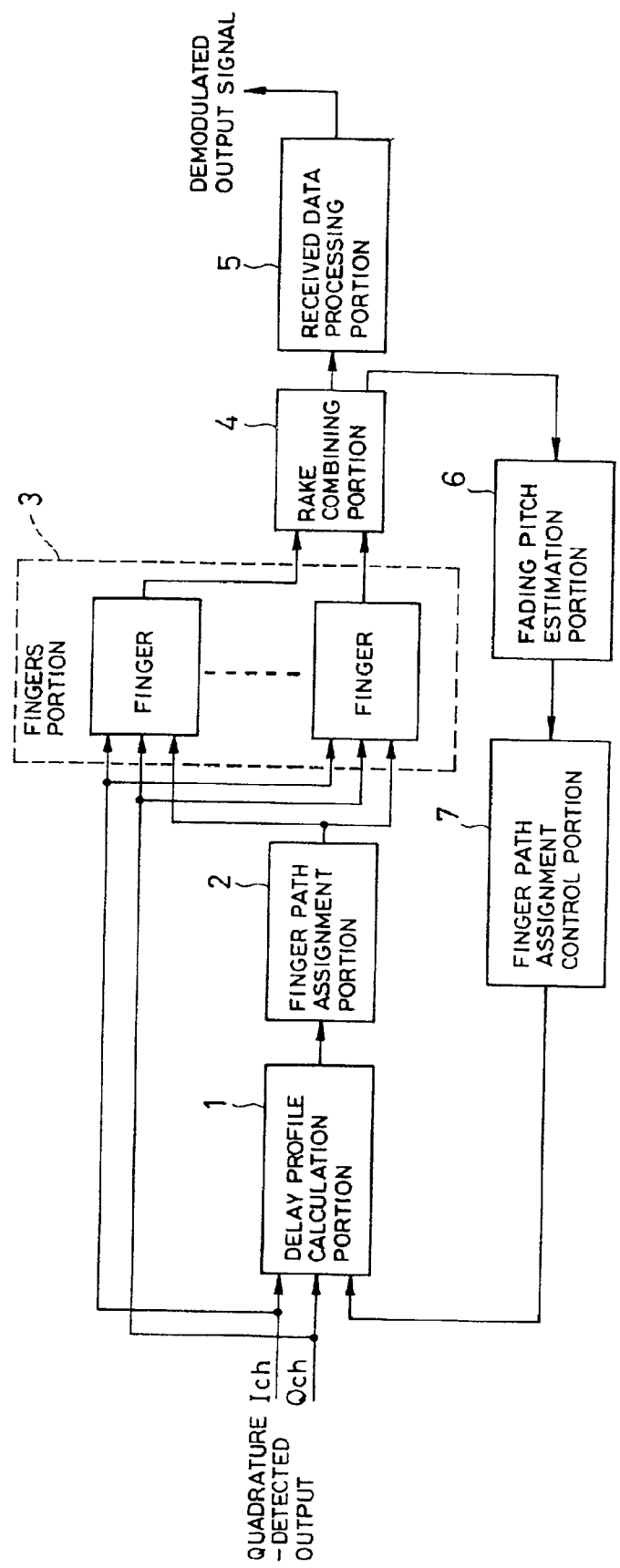
FIG. 7 is a block diagram of a second embodiment.
Figure 8:
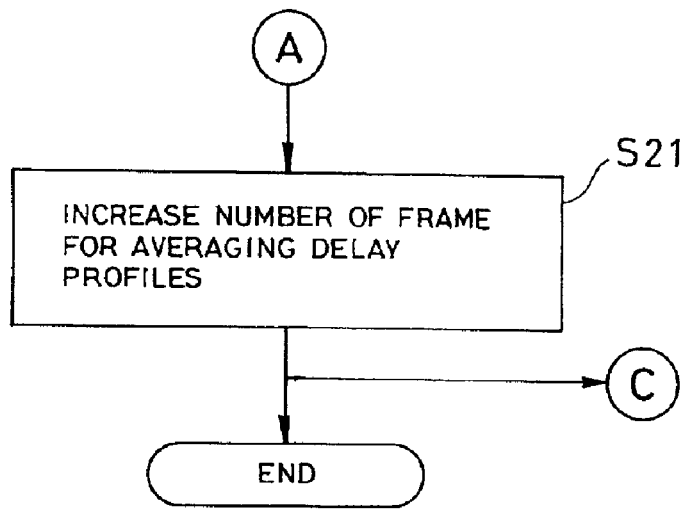
FIG. 8 is a flow chart showing the operation of the second embodiment.

Next, a second embodiment will be described. According to the second embodiment, it is possible to produce a similar effect of reducing degradation in receiving characteristics due to fading by controlling calculation of delay profiles in the delay profile calculation portion 1 instead of controlling the guard levels in assigning path to the fingers. FIG. 7 is a block diagram of the second embodiment, and FIG. 8 is a flow chart showing an operation of the second embodiment. Steps from S11 to S13 in the operation of controlling finger path assignment are same as those in the first embodiment, thereby not shown nor described about their operation.

Referring to FIG. 7, output of the finger path assignment control portion 7 is inputted to the delay profile calculation portion 1. Now, referring to FIG. 8, after the fading pitch estimation portion 6 estimates the fading pitch and predicts the time of the next level attenuation (if YES at the step S13), the finger path assignment control portion 7 controls the delay profile calculation portion 1 to increase the number of averaging frame for the delay profile calculation (S21). For example, the delay profile calculation portion 1 that might create and average delay profiles per three frames would be changed to create and average delay profiles per five frames.

That is, the increased number of averaging frame for delay profiles prevents delay profiles from being calculated only with received data suffered from intense fading, and reduces errors in path search.

Next, a third embodiment will be described. On intense fading, the third embodiment stops updating the finger path assignment in the finger path assignment control portion 7 instead of controlling the guard levels and the number of averaging frame for delay profile calculation. This makes it possible to produce a similar effect of reducing degradation in the receiving characteristics due to fading, as well as to reduce power consumption.

Figure 9:
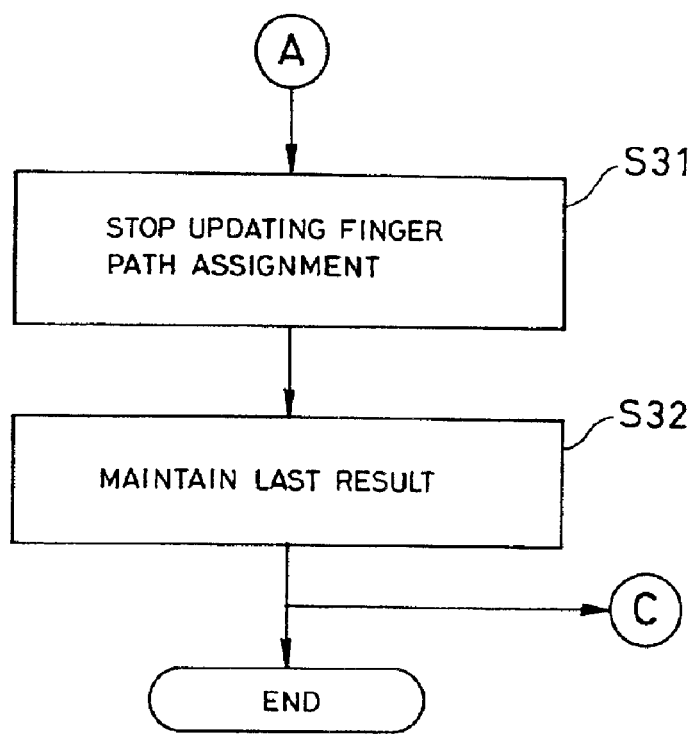
FIG. 9 is a flow chart showing the operation of a third embodiment.

FIG. 9 is a flow chart showing the operation of the third embodiment. Steps from S11 to S13 in the operation of the finger path assignment are same as those in the first embodiment, thereby not shown nor described about their operation. The configuration of the third embodiment is also same as that of the first embodiment (see FIG. 1). Referring to FIG. 9, after the fading pitch estimation portion estimates the fading pitch and predicts the time of the next level attenuation (if YES at the step S13), the finger path assignment control portion 7 stops updating the finger path assignment in the finger path assignment portion 2 (S31). Then, it makes the finger path assignment portion 2 to maintain the last result (finger paths)(S32).

Figure 10:
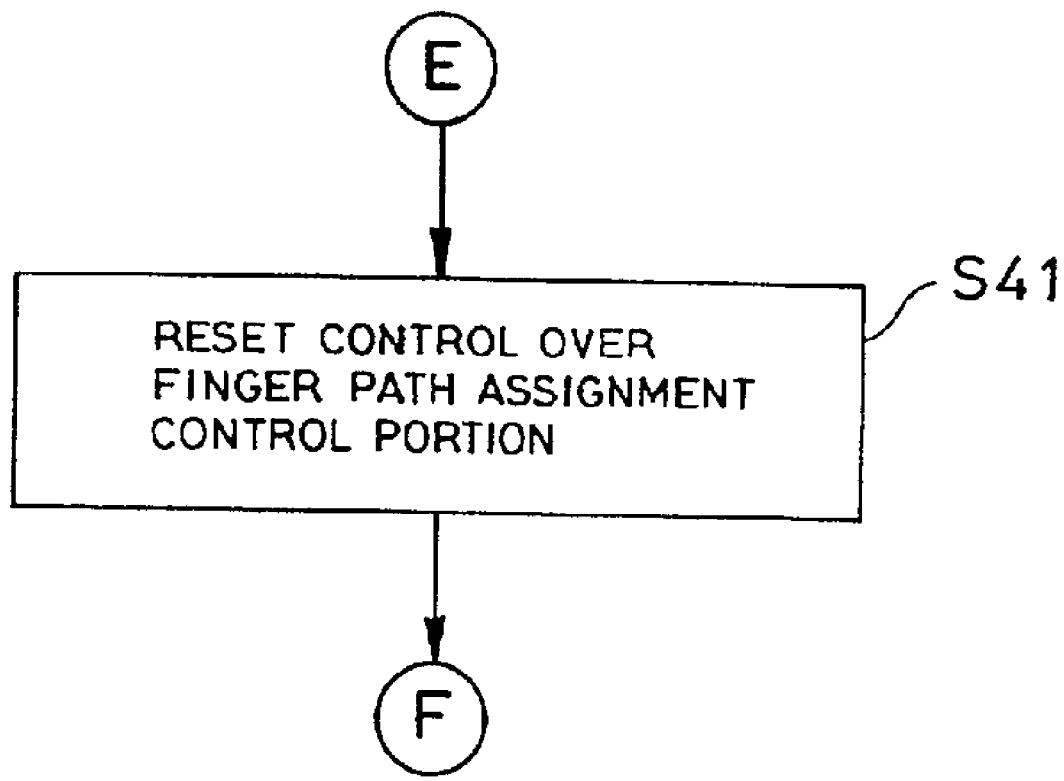
FIG. 10 is a flow chart showing the operation of a fourth embodiment.

Next, a fourth embodiment will be described. The fourth and subsequent embodiments represent the operation in a case where the fading pitch further changes after the finger path assignment is performed in accordance with the estimated fading pitch. FIG. 10 is a flow chart showing operation of the fourth embodiment. Again, the steps from S11 to S13 in FIG. 6 will be similarly used in the embodiments below. Referring to FIG. 10, after the fading pitch estimation portion estimates the fading pitch and predicts the time of the next level attenuation (if YES at the step S13), the finger assignment control portion 7 resets its control (S41) and restart from the first process (see S11 in FIG. 6).

Next, a fifth embodiment will be described. The flow chart of FIG. 6 will be used for the operation of the fifth embodiment. That is, after the guard levels of the finger path assignment control portion 7 are increased (S14), the fading pitch estimation portion 6 is again made to estimate the fading pitch (S13). Description about further operation will be omitted, as it has been given above.

Next, a sixth embodiment will be described. The flow chart of FIG. 8 will be used for an operation of the sixth embodiment. That is, after the number of averaging frame for delay profiles is increased (S21), the fading pitch estimation portion 6 is again made to estimate the fading pitch (S13). Description about further operation will be omitted, as it has been given above.

Next, a seventh embodiment will be described. The flow chart of FIG. 9 will be used for the operation of the seventh embodiment. That is, after the last result is maintained (S32), the fading pitch estimation portion 6 is again made to estimate the fading pitch (S13). Description about further operation will be omitted, as it has been given above.

The present invention makes it possible to maintain good reception quality even in a mobile environment. This is because the present invention is the CDMA demodulation circuit comprising the delay profile calculating means for calculating delay profiles of received signals; the path assigning means for assigning path locations to the plurality of fingers based on the calculation result obtained in the delay profile calculation means; the plurality of fingers to which the path locations are assigned by the path assignment means, the fingers de-spreading the assigned paths; and the rake combining means for combining output of the plurality of fingers; wherein the demodulation circuit comprises the reception control means that estimates the drop cycle of the reception level from the reception level combined by the rake combining means to reduce degradation in receiving characteristics using the estimation result.

Further, the other invention according to the present invention provides a similar effect as the above present invention. This is because the invention is the demodulation method for the CDMA demodulation circuit comprising the delay profile calculating means for calculating delay profiles of received signals; the path assigning means for assigning path locations to the plurality of fingers based on the calculation result obtained in the delay profile calculation means; the plurality of fingers to which the path locations are assigned by the path assignment means, the fingers de-spreading the assigned paths; and the rake combining means for combining output of the plurality of fingers; wherein the demodulation method comprises the first step of estimating the drop cycle of the reception level from the reception level combined by the rake combining means to reduce degradation in receiving characteristics using the estimation result.

More specifically, a first effect is that it is possible to reduce degradation in updating the path locations for assigning to the fingers due to fading by controlling the forward alignment guard level for the assignment to the fingers. This is because the estimation of the fading pitch makes it possible to reduce the fading influence by maintaining, during intense fading causes level attenuation of received data, the finger assignment result obtained with a good receiving state.

A second effect is that it is possible to reduce degradation in updating the path locations for assigning to the fingers due to fading by controlling the backward alignment guard level for the assignment to the fingers. This is because the estimation of the fading pitch makes it possible to reduce the fading influence by reducing tendency of adopting finger assignment result to be obtained during intense fading causes level attenuation of received data.

A third effect is that it is possible to maintain good receiving characteristics by avoiding fading influence prior to suffering from it. This is because the estimation of the fading pitch makes it possible to estimate the level attenuation to be caused by the next fading and to control the processing of path assignment to the fingers before the level attenuation begins.

Further, by stopping the update of the finger paths assignment in the finger path assignment control portion 7, it is also possible to produce a similar effect of reducing degradation in receiving characteristics due to fading, and power consumption can be reduced.

What is claimed is:

1. A Code Division Multiple Access (CDMA) demodulation circuit comprising:
    delay profile calculating means for calculating delay profiles of received signals;
    path assigning means for assigning path locations to a plurality of fingers based on a calculation result obtained in said delay profile calculating means, the plurality of fingers to which the path locations being assigned by said path assigning means, the fingers de-spreading the assigned paths;
    rake combining means for combining outputs of said plurality of fingers; and
    reception controlling means that estimates a drop cycle of a reception level by measuring an amount of a reception level combined by said rake combining means and comparing said amount to a threshold and that reduces a degradation in receiving characteristics using an estimation result.

2. The CDMA demodulation circuit according to claim 1, wherein said drop cycle of the reception level comprises a fading pitch obtained when receiving, while moving, reception waves that form standing waves upon being at least one of reflected and diffracted by obstacles.

3. The CDMA demodulation circuit according to claim 1, wherein said reception controlling means comprises:
    drop cycle estimating means for estimating the drop cycle of a reception level from the reception level combined by said rake combining means; and
    path assignment controlling means for controlling said path assigning means based on the estimation result obtained in said drop time estimating means.

4. The CDMA demodulation circuit according to claim 3, wherein said path assignment controlling means increases guard levels in updating a path timing for the fingers in said path assigning means if said drop cycle estimating means determines that a dropping of the reception level will be intense.

5. The CDMA demodulation circuit according to claim 1, wherein said reception controlling means comprises:
    drop cycle estimating means for estimating the drop cycle of the reception level from the reception level combined by said combining means; and
    delay profile averaging cycle controlling means for controlling an averaging cycle for the delay profiles in said delay profile calculating means based on an estimation result obtained in said drop time estimating means.

6. The CDMA demodulation circuit according to claim 5, wherein said delay profile averaging cycle controlling means increases a number of averaging frames for said delay profiles if said drop cycle estimating means determines that the dropping of the reception level will be intense.

7. The CDMA demodulation circuit according to claim 3, wherein an update of a finger path assignment in said finger path assignment controlling means and in said delay profile averaging cycle controlling means is stopped to make said finger path assigning means to maintain the a last result if said drop cycle estimating means determines that a dropping of the reception level will be intense.

8. A Code Division Multiple Access (CDMA) demodulation method for a CDMA demodulation circuit comprising delay profile calculating means for calculating delay profiles of received signals, path assigning means for assigning path locations to a plurality of fingers based on the calculation result obtained in said delay profile calculating means, the plurality of fingers to which the path locations being assigned by said path assigning means, the fingers de-spreading the assigned paths, and rake combining means for combining outputs of the plurality of fingers, wherein the CDMA demodulation method comprises:
    estimating a drop cycle of a reception level from by measuring an amount of a reception level combined by said rake combining means and comparing said amount to a threshold to reduce a degradation in receiving characteristics using an estimation result.

9. The CDMA demodulation method according to claim 8, wherein said drop cycle of the reception level comprises a fading pitch obtained when receiving, while moving, reception waves that form standing waves upon being at least one of reflected and diffracted by obstacles.

10. The CDMA demodulation method according to claim 8, wherein said estimating comprises:
   estimating the drop cycle of the reception level from the reception level combined by said rake combining means; and
   controlling said path assigning means based on the estimation result obtained at said eleventh step.

11. The CDMA demodulation method according to claim 10, wherein guard levels in updating a path timing for said fingers in said path assigning means is increased at said controlling if it is determined that a dropping of the reception level will be intense at said estimating.

12. The CDMA demodulation method according to claim 8, wherein estimating comprises:
   estimating the drop cycle of the reception level from the reception level combined by said rake combining means; and
   controlling an averaging cycle for the delay profiles in said delay profile calculating means based on the estimation result obtained at said estimating.

13. The CDMA demodulation method according to claim 12, wherein a number of averaging frames for the delay profiles is increased at said controlling if it is determined that a dropping of the reception level will be intense at said estimating.

14. The CDMA demodulation method according to claim 10, wherein the method further comprises:
   stopping an update of the finger path assignments at said controlling to make said finger path assigning means to maintain a last result if it is determined that the dropping of the reception level will be intense at said estimating.

15. The CDMA demodulation method according to claim 10, wherein the method further comprises:
   resetting processing at said controlling to restart from said first estimating if the drop cycle of the reception level further changes after assigning finger paths in accordance with the estimated drop cycle of the reception level.

16. The CDMA demodulation method according to claim 10, wherein said estimating is performed again after increasing a guard level at said controlling.

17. The CDMA demodulation method according to claim 12, wherein said estimating is performed again after increasing a number of averaging frames for the delay profiles at said controlling.

18. The CDMA demodulation method according to claim 14, wherein said estimating is performed again after making said path assigning means to maintain the last result at said stopping.

19. The CDMA demodulation method according to claim 10, wherein said estimating comprises:
   a first determining of whether or not an absolute value of a difference between a last calculated drop cycle of the reception level and a currently calculated drop cycle of the reception level is equal to or below a predetermined value; and
   a second determining of, if the absolute value is equal to or below the predetermined value, whether or not the determination of the absolute value being equal to or below the predetermined value has continued for a predetermined number of times.

20. The CDMA demodulation method according to claim 19, wherein the method further comprises determining an average of the drop cycles of the reception level measured when the determination of the absolute value being equal to or below the predetermined value has continued for the predetermined times at said second determining.

21. A Code Division Multiple Access (CDMA) demodulation circuit comprising:
   a delay profile calculator that calculates delay profiles of received signals;
   a path assigning module that assigns path locations to a plurality of fingers based said delay profiles, the plurality of fingers to which the path locations being assigned by said path assigning module, the fingers de-spreading the assigned paths;
   a rake combiner that combines outputs of said plurality of fingers; and
   a reception controller that calculates an estimate for a future reception level drop cycle from a reception level combined by said rake combiner, said estimate being used to reduce: a degradation in receiving characteristics of said CDMA demodulation circuit before said reception level actually drops, said estimate being calculated by measuring an amount of a reception level combined by said rake combiner and comparing said amount to a threshold.

22. A Code Division Multiple Access (;CDMA) demodulation method comprising:
   estimating a future drop cycle of a reception level due to fading by measuring an amount of a reception level and comparing said amount to a threshold; and
   applying said future drop cycle estimate to reduce degradation in receiving characteristics before said reception level actually drops.

* * * * *